United States Patent

[11] 3,585,362

| [72] | Inventors | Paul A. Hoogesteger<br>Penfield;<br>Charles R. McDougal, Pittsford, both of, N.Y. |
|---|---|---|
| [21] | Appl. No. | 788,457 |
| [22] | Filed | Jan. 2, 1969 |
| [45] | Patented | June 15, 1971 |
| [73] | Assignee | Bausch & Lomb Incorporated<br>Rochester, N.Y. |

[54] PORTABLE ELECTRICAL HEATING DEVICE
11 Claims, 4 Drawing Figs.

[52] U.S. Cl. ................................................. 219/437,
219/289, 219/293, 219/439
[51] Int. Cl. .................................................. F27d 11/04
[50] Field of Search ........................................... 219/282,
284, 293, 295, 429, 437-8, 441, 43-4, 391, 521,
288-9, 285-6, 290, 316-19, 523, 530

[56] References Cited
UNITED STATES PATENTS

| 1,037,369 | 9/1912 | Thompson | 219/293 X |
| 1,683,071 | 9/1928 | Hanks et al. | 219/288 |
| 1,738,360 | 12/1929 | Davies | 219/293 |
| 1,952,774 | 3/1934 | Pargman | 219/293 |
| 2,827,541 | 3/1958 | Baldwin | 219/293 X |
| 2,837,625 | 6/1958 | Conlin et al. | 219/288 X |
| 2,881,692 | 4/1959 | Volcov | 219/284 X |
| 3,222,499 | 12/1965 | Conlin et al. | 219/289 |
| 3,347,618 | 10/1967 | McKeown | 219/284 X |

FOREIGN PATENTS

| 817,328 | 10/1951 | Germany | 219/288 |
| 247,658 | 3/1947 | Switzerland | 219/293 |
| 391,999 | 9/1965 | Switzerland | 219/288 |

Primary Examiner—Volodymyr Y. Mayewsky
Attorneys—Frank C. Parker and James C. Simmons ABSTRACT: A household electrical heating device of the type that uses the rapid conversion of a quantity of water to steam as the operative heating means. The heating device is characterized in that means are provided for spilling of the water and prevention of contact with the water by the user when the heating element that is in direct contact with the water is energized.

PATENTED JUN 15 1971
3,585,362
SHEET 1 OF 2
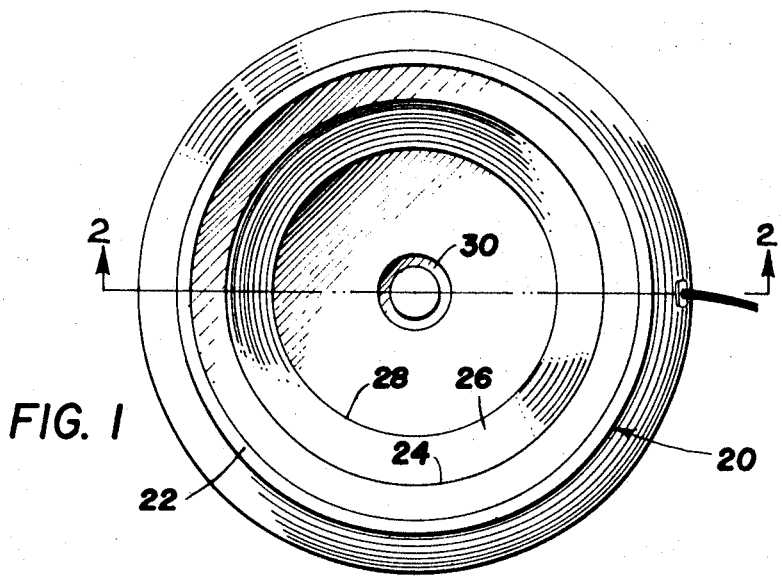
FIG. I
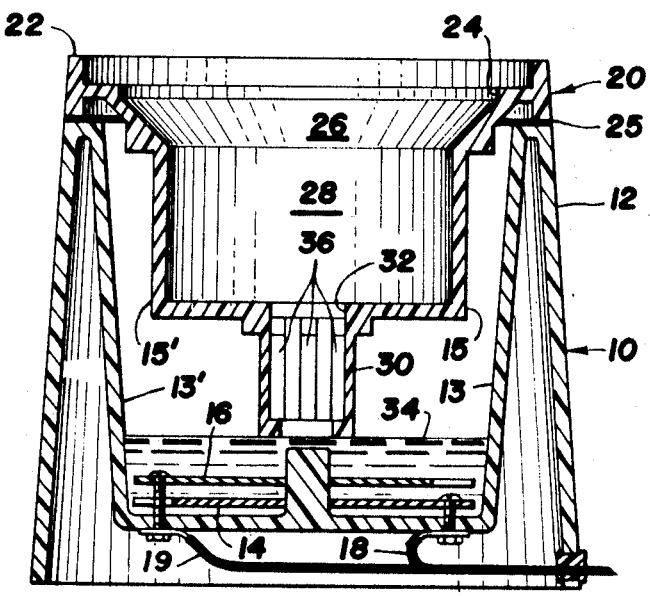
FIG. 2
PAUL A. HOOGESTEGER
CHARLES R. McDOUGAL
INVENTORS
BY James C. Simmons
ATTORNEY

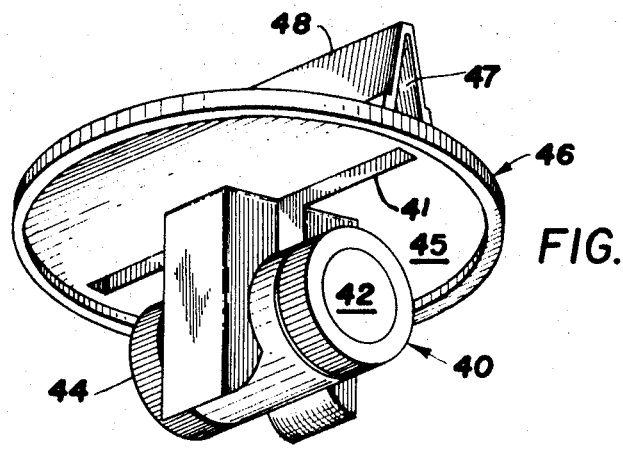
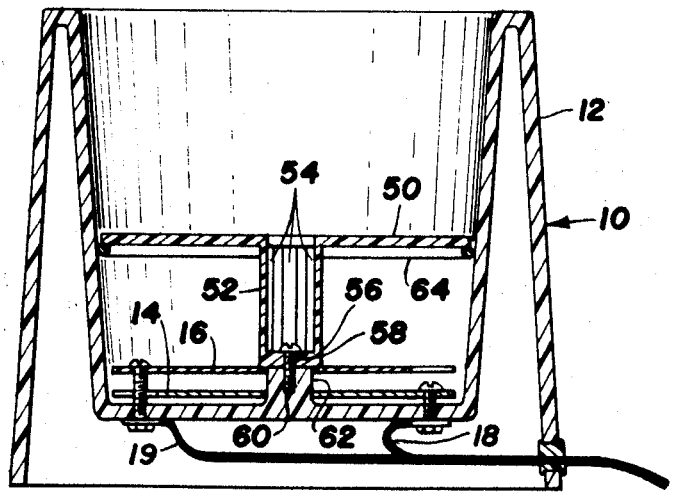

3,585,362

1

PORTABLE ELECTRICAL HEATING DEVICE

CROSS-REFERENCES TO THE RELATED APPLICATIONS

None.

BACKGROUND OF THE INVENTION

This invention pertains to household electrical heating devices such as commonly used for warming baby bottles. The well-known baby bottle warmers are also used as medical vaporizers and can be used for heating and sterilizing a variety of small objects. The well-known devices operate by using a small amount of water heated and converted to steam to envelop the article being heated.

The well-known heating devices available have one serious drawback. This drawback is that when the water is in place and the heating elements are energized there is no way to prevent spilling the heated water if the device is accidentally tipped over, nor is there any guard means for preventing contact with the water that is in direct contact with the electrical heating means. With the well-known device it is possible to get an electrical shock or a severe burn if the device is misused.

SUMMARY OF THE INVENTION

In order to avoid the above-mentioned problems, we have devised a device to be used in connection with a well-known small household heater (baby bottle warmers) that will contain the water if the device is tipped over and at the same time prevent a completed circuit between the water, the heater and the user if the device is mishandled while the heating element is energized. This improved device is accomplished without sacrificing the rapid heating characteristics of the warming device. The device according to our invention can be easily attached to known warmers.

Therefor, it is the primary object of this invention to provide an improved household heating device.

It is another object of this invention to provide a heating device that can be used as a sterilizing device.

It is still another object of this invention to provide a device adaptable to existing household heating devices.

BRIEF DESCRIPTION OF THE DRAWINGS

FIG. 1 is a top view of one embodiment of the present invention.

FIG. 2 is a vertical section taken along line 2—2 of FIG. 1.

FIG. 3 is a perspective view of a sterilizing device used in conjunction with the present invention.

FIG. 4 is a cross-sectional view similar to FIG. 2 of a second embodiment of the present invention.

DETAILED DESCRIPTION OF THE PREFERRED EMBODIMENTS

There is shown in FIG. 2 a conventional warming device 10 consisting of an outer case 12. Disposed within the outer case 12 is a first element 14 such as a plate electrode and the second element 16 such as a plate electrode. The plate electrodes 14 and 16 are connected to electrical leads 18 and 19 respectively which are passed through the case 12 to a suitable plug, not shown. Disposed within the case 12 is shown an insert device of the instant invention generally designated 20. The insert 20 can be formed as an integral unit of any electrical insulating material capable of withstanding repeated exposure to steam and is preferably formed of synthetic plastic material. The top portion of insert 20 is an annular ring 22 and attached to the annular ring 22 is a series of stepped rings 24 and 26. Ring 26 is conveniently provided with a sloped surface. Attached to ring 26 is the article receiving member 28 generally cylindrical in shape. Depending from article receiving member 28 is a generally cylindrical member 30 which communicates with an aperture 32 in member 28. Member 30 is provided with slots 36 to allow the steam to escape into the area defined by member 28. The insert member 20 can be fastened to the case 12 at an aperture defined therein by any well-known adhesive shown as 25 in FIG. 2.

The article receiving member 28 is so constructed that the volume of water used in the device is less than the volume defined by the area between either internal side of the case 13—13' and the corresponding side of the insert member 20 shown as 15—15' respectively. The device cannot be overfilled because water will appear on the bottom of portion 28 of member 20 because of slots 36. The volumetric relation is such that at this level the water can still be contained if the device is accidentally tipped on the side. Of course, this excess water is not required for the operation of the heating unit.

In operation, the device of FIG. 2 is filled to a predetermined level with water as shown by numeral 34. The article to be heated can then be placed in member 28 and plug inserted in any wall outlet. The water acts as an electrically conductive link between plate electrodes 14 and 16 thereby completing an electric circuit. Electrical flow between plate electrodes 14 and 16 causes the water to heat to a sufficient temperature to form steam. The steam, which has been rapidly converted from the water, passes through slots 36 in member 30 and escapes upwardly freely surrounding any article placed within member 28. Steam will continue to be formed from the water until the water level has been reduced below the position of plate electrodes 16 thereby breaking the electrical circuit and automatically deactivating the heating device.

Shown in FIG 3 is one such device that may be used for sterilizing contact lenses. As shown in FIG. 3, numeral 40 generally designates a contact lens storage case. Such contact lens storage cases are well known and contain two end caps 42, 44 underneath which are stored the contact lenses. The contact lens storage case 40 generally holds a solution in contact with the lens so that if the temperature of the case 40 is raised the solution is heated effecting sterilization of the lenses. A cylindrical case such as 40 can be held by a device shown generally as 46 which comprises a top portion 45 with a vent 41, the vent communicating through the top 45 and is vented to the atmosphere by a device such as shown as 48 in FIG. 3. The venting means 48 can be in any convenient configuration. The one shown 48 is also a handle for handling the cover without coming in contact with the escaping steam, because the steam is directed away from the top by triangular opening 47. The diameter of the cover 46 approximates the diameter of ring 22 shown in FIG. 2 so that when the cover is placed on the device a seal is made. Therefor, the escaping steam surrounds the contact lens storage case 40 and escapes from the case in a manner directed by slot 41 and aperture 47 in handle 48, thereby sterilizing the contact lenses.

An alternative embodiment is shown in fig. 4, wherein the same basic heating element is disclosed with the same parts as shown by the same numbers in FIG. 2. The sealing means of FIG. 4 comprises a flat insulating disc 50 with a depending member 52 containing vertical slots 54. The center part of the depending number 52 has a bottom plate 56 with a central aperture 58 for receiving the fastening means 60 for securely attaching the insulating member 50—52 to the heating device 10 by means of a suitable receiving portion 62 provided in the heating device 10. A water seal is maintained by providing a suitable peripheral sealing member such as an O-ring 64. Any suitable sealing means can be used. An O-ring is shown here for convenience. The device 50—52 can be fabricated as a single piece or in separate pieces and subsequently joined together from any suitable electrical insulating material. Any easily formable synthetic plastic materials that withstand repeated exposure to steam is suitable for this application.

With the construction as shown if the device is tipped over, the water, at normal operating water levels, is confined with respect to FIG. 2, between the insert member 20 and either internal side 13 or internal side 13' depending upon the direction in which the device is tipped. In the alternative embodiment the water is confined between plate 50 and the internal walls of the case 12, as illustrated in FIG. 4. The water can only be removed by turning the device completely upside down which is a very remote accident possibility. It is also obvious that there can be no contact between the water which is in contact with the electrical means and a user by touching the case on any inside surface. Therefor, the device or the devices as disclosed in our application provide a safe heating means.

Having thus described our invention by reference to preferred embodiments we wish it understood that it may be embodied in other forms without departing from the scope of the appended claims.

We claim:

1. A device for heating an article to be placed therein, comprising:
   a. a case having a normal upright position and defining therein a walled article receiving chamber for receiving an article and a walled liquid receiving chamber for holding a liquid, fillable to a predetermined level, the walls of said liquid receiving chamber defining an aperture therein for the introduction of a liquid, the walls of said article receiving chamber defining an aperture therein for receiving heated vapors from said liquid receiving chamber, said two chambers being otherwise separated from each other, the volume of liquid defined by filling to said predetermined level being less than the volume of liquid said liquid receiving chamber will hold when said case is tipped on its side, said apertures being located above the level said volume of liquid will assume when said case is tipped on its side;
   b. conduit means connected at one end to said liquid introducing aperture in said liquid receiving chamber and connected at its other end to said heated vapors receiving aperture in said article receiving chamber; and
   c. electrical heating means disposed below said predetermined level of liquid in said liquid receiving chamber for heating said liquid to a sufficient temperature to form the heated vapors.

2. The device according to claim 1 wherein said conduit means comprises a tube having slots therein to facilitate the introduction of liquid into said liquid receiving chamber and the escapement of heated vapors into said article receiving chamber from said liquid receiving chamber.

3. The device according to claim 2 wherein the connection point of said conduit means and said liquid introducing aperture of said liquid receiving chamber is visible to a user of said device, said connection point defining said predetermined level so that the user may observe when said liquid has reached said predetermined level.

4. The device according to claim 3 wherein said article receiving chamber comprises a removable portion of said case, said removable portion including sealing means for sealably separating said article receiving chamber from said liquid receiving chamber when said removable portion is fully inserted in said case.

5. The device according to claim 1 wherein said article receiving chamber is of annular shape, said liquid receiving chamber is of annular shape and said liquid receiving chamber partially surrounds said article receiving chamber to receive said liquid if said case is tipped on its side irrespective of the direction in which said case is tipped.

6. The device according to claim 5 which further comprises conduit means connected at one end to said liquid introducing aperture in said liquid receiving chamber and connected at its other end to said heated vapors receiving aperture in said article receiving chamber.

7. The device according to claim 6 wherein said conduit means comprises a tube having slots therein to facilitate the introduction of liquid into said liquid receiving chambers and the escapement of heated vapors into said article receiving chamber from said liquid receiving chamber.

8. The device according to claim 7 wherein the connection point of said conduit means and said liquid introducing aperture of said liquid receiving chamber is visible to a user of said device, said connection point defining said predetermined level so that the user may observe when said liquid has reached said predetermined level.

9. The device according to claim 8 wherein said article receiving chamber comprises a removable portion of said case, said removable portion including sealing means for sealably separating said article receiving chamber from said liquid receiving chamber when said removable portion is fully inserted in said case.

10. In a portable electrical heating device of the kind comprised of a one-piece cuplike member having a normal upright orientation and defining therein a reservoir with electrical heating means disposed at the bottom thereof for heating a predetermined volume of liquid to a sufficient temperature to form heated vapors which may be introduced into said cuplike member to cover said electrical heating means, the improvement comprising:
   an insert member sealably engageable with said cuplike member to define within said reservoir a space below said insert member and above the level assumed by said predetermined volume of liquid, said insert member defining an aperture for the passage of liquid and an aperture for the passage of heated vapors, said apertures comprising a tube having slots therein to facilitate the introduction of liquid and the escape of heated vapors, and said apertures being disposed within said insert member at a sufficient distance from the walls of said cuplike member that said insert member will contain said predetermined volume of liquid if said heating device is tipped on its side.

11. The improvement according to claim 10 wherein the bottom of said tube is visible to a user of said device, said bottom defining said predetermined level so that the user may observe when said liquid has reached said predetermined level.

UNITED STATES PATENT OFFICE
CERTIFICATE OF CORRECTION

Patent No. 3,585,362　　　　　Dated　June 15, 1971

Inventor(s) PAUL A. HOOGESTEGER and CHARLES R. McDOUGAL

It is certified that error appears in the above-identified patent and that said Letters Patent are hereby corrected as shown below:

Page 1, col. 2, line 4 of ABSTRACT, before "spilling"
　　　　　insert -- preventing --

Signed and sealed this 2nd day of November 1971.

(SEAL)
Attest:

EDWARD M. FLETCHER, JR.　　　　ROBERT GOTTSCHALK
Attesting Officer　　　　　　　　Acting Commissioner of Patents

FORM PO-1050 (10-69)